(12) United States Patent
Du

(10) Patent No.: US 12,030,613 B2
(45) Date of Patent: Jul. 9, 2024

(54) WING DETACHMENT ASSEMBLY AND AERIAL VEHICLE

(71) Applicant: AUTEL ROBOTICS CO., LTD., Guangdong (CN)

(72) Inventor: Yuanyuan Du, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 198 days.

(21) Appl. No.: 17/653,522

(22) Filed: Mar. 4, 2022

(65) Prior Publication Data

US 2022/0234717 A1 Jul. 28, 2022

Related U.S. Application Data

(63) Continuation of application No. PCT/CN2020/123362, filed on Oct. 23, 2020.

(30) Foreign Application Priority Data

Sep. 5, 2019 (CN) .......................... 201921474698.5

(51) Int. Cl.
*B64C 1/26* (2006.01)
*F16B 39/28* (2006.01)

(52) U.S. Cl.
CPC ................. *B64C 1/26* (2013.01); *F16B 39/28* (2013.01)

(58) Field of Classification Search
CPC ........... B64C 1/26; F16B 39/28; A63H 27/02; B64U 10/25; B64U 30/10
See application file for complete search history.

(56) References Cited

U.S. PATENT DOCUMENTS 7,182,666 B2   2/2007  Castaner
2006/0091258 A1*  5/2006  Chiu ..................... B64C 39/024
                                              244/119

(Continued)

FOREIGN PATENT DOCUMENTS

CN    102180257  A  *  9/2011
CN    201989945  U  *  9/2011

(Continued)

OTHER PUBLICATIONS

Extended European Search Report dated Jan. 4, 2023; Appln. No. 20860994.1.

(Continued)

*Primary Examiner* — Assres H Woldemaryam
(74) *Attorney, Agent, or Firm* — Ladas & Parry LLP

(57) ABSTRACT

Embodiments of the present invention discloses a wing detachment assembly and an aerial vehicle. The wing detachment assembly includes a first connecting portion and a second connecting portion, one of the first connecting portion and the second connecting portion being fixed on a wing and the other being fixed on a vehicle body. The second connecting portion includes a thumb wheel, the thumb wheel being provided with a threaded hole and being rotatably mounted on the vehicle body or the wing. The first connecting portion is threadedly connected to a threaded hole of the thumb wheel, the first connecting portion and the thumb wheel being fastened or detached when the thumb wheel is rotated. The aerial vehicle includes the foregoing wing detachment assembly. The wing detachment assembly and the aerial vehicle have the advantage of being convenient to detach and mount the wing.

16 Claims, 5 Drawing Sheets

(56) References Cited

U.S. PATENT DOCUMENTS

2011/0315820 A1* 12/2011 Andre .................. B64C 1/26
                                                    244/117 R
2018/0057136 A1*  3/2018 Haley ................. A63H 27/001

FOREIGN PATENT DOCUMENTS

| | | | | |
|---|---|---|---|---|
| CN | 102310941 | A |   | 1/2012 |
| CN | 105366025 | A |   | 3/2016 |
| CN | 207106851 | U | * | 3/2018 |
| CN | 207697985 | U |   | 8/2018 |
| CN | 208085994 | U | * | 11/2018 | ............. B64C 1/069 |
| CN | 208119445 | U | * | 11/2018 |
| CN | 109572984 | A | * | 4/2019 |
| CN | 109572991 | A |   | 4/2019 |
| CN | 109720564 | A | * | 5/2019 |
| CN | 109733588 | A | * | 5/2019 |
| CN | 109808870 | A | * | 5/2019 |
| CN | 208897306 | U | * | 5/2019 |
| CN | 208963299 | U |   | 6/2019 |
| CN | 211618061 | U |   | 10/2020 |
| DE |   2531388 | A1 |  | 1/1977 |
| KR | 20160116734 | A |  | 10/2016 |
| WO | WO-2013142805 | A1 | * | 9/2013 | ............. B64D 11/00 |

OTHER PUBLICATIONS

PCT International Search Report dated Feb. 1, 2021; PCT/CN2020/123362 with English Translation.

* cited by examiner

WING DETACHMENT ASSEMBLY AND AERIAL VEHICLE

CROSS REFERENCE

The present application is a continuation of International Application No. PCT/CN2020/123362, filed on Oct. 23, 2020, which claims priority to Chinese patent application No. 2019214746985, filed on Sep. 5, 2019, which is incorporated herein by reference in its entirety.

TECHNICAL FIELD

The utility model relates to the field of aerial vehicle technologies, and in particular, to a wing detachment assembly and an aerial vehicle.

BACKGROUND

An aerial vehicle may provide people with entertainment or may perform a task for people. For example, the aerial vehicle may be used as an important tool for high-altitude photography. Generally, the aerial vehicle includes a wing and a vehicle body. The aerial vehicle may occupy a relatively large space due to such a relatively long wing. Accordingly, an aerial vehicle having a detachable wing has emerged. However, an existing solution for detaching and mounting the wing of the aerial vehicle is relatively inconvenient and requires a dedicated detachment tool.

Therefore, how to provide a solution for conveniently detaching and mounting the wing of the aerial vehicle has become a technical requirement in the related art.

SUMMARY

The utility model is mainly intended to provide a wing detachment assembly and an aerial vehicle, to resolve an existing technical problem that a solution for detaching and mounting a wing of an aerial vehicle is relatively inconvenient.

According to a first aspect, the utility model provides a wing detachment assembly, configured to detachably connect a wing of an aerial vehicle to a vehicle body of the aerial vehicle. The wing detachment assembly includes a first connecting portion and a second connecting portion, one of the first connecting portion and the second connecting portion being fixed on the wing and the other being fixed on the vehicle body.

The second connecting portion includes a thumb wheel, the thumb wheel being provided with a threaded hole and being rotatably mounted on the vehicle body or the wing;

The first connecting portion is threadedly connected to a threaded hole of the thumb wheel, the first connecting portion and the thumb wheel being fastened or detached when the thumb wheel is rotated.

Preferably, the thumb wheel is disc-shaped, an edge of the thumb wheel is roughly configured and a center of the thumb wheel is provided with the threaded hole, the threaded hole being a through hole.

Preferably, the second connecting portion further includes a blocking member fixedly connected to one side of the thumb wheel.

Preferably, the blocking member is cylindrical and is provided with a center hole, the center hole being concentric to the threaded hole.

Preferably, a diameter of the center hole is greater than or equal to a diameter of the threaded hole, a thread being disposed on a hole wall of the center hole.

Preferably, the first connecting portion includes a threaded post, the threaded post being fixed on the wing or the vehicle body and being threadedly connected to the threaded hole.

Preferably, the first connecting portion further includes a connecting plate, the connecting plate being fixedly connected to the threaded post and being fixed on the vehicle body or the wing.

Preferably, the connecting plate is fixed on an inner wall of a housing of the vehicle body or the wing and the threaded post passes through the housing of the vehicle body or the wing to be threadedly connected to the thumb wheel.

Preferably, the threaded post includes a bolt and a fixing block, the bolt being fixedly connected to the fixing block, and the connecting plate is provided with a fixing hole, the fixing block being fixed in the fixing hole and the fixing hole limiting the fixing block in rotating.

According to a second aspect, the utility model further provides an aerial vehicle. The aerial vehicle includes a vehicle body, a wing and the foregoing wing detachment assembly. The wing is detachably connected to the vehicle body by using the wing detachment assembly and a part of the thumb wheel protrudes out of the vehicle body or the wing to which the thumb wheel is fixed.

Compared with existing technologies, in the utility model, the second connecting portion includes a thumb wheel, the thumb wheel being provided with a threaded hole and being rotatably mounted on the vehicle body or the wing. The first connecting portion is threadedly connected to a threaded hole of the thumb wheel, the first connecting portion and the thumb wheel being fastened or detached when the thumb wheel is rotated. In this way, the wing can be quickly mounted on the vehicle body and the wing can also be quickly detached from the vehicle body without using a dedicated detachment tool, which is easy to manually detach and mount.

DETAILED DESCRIPTION

To make the objectives, technical solutions and advantages of the utility model clearer and more comprehensible, the following further describes the utility model in detail with reference to the accompanying drawings and embodiments. It is to be understood that specific embodiments described herein are merely used to describe the utility model, but are not intended to limit the utility model. All other embodiments obtained by a person of ordinary skill in the art based on the embodiments of the utility model without creative efforts shall fall within the protection scope of the utility model.

The terms such as "first", "second", "third" and "fourth" (if any) in this specification, claims and the accompanying drawings of the present application are used for distinguishing between similar objects and not necessarily used for describing any particular order or sequence. It is to be understood that the data used in such a way is interchangeable in proper cases, so that the embodiments described herein can be implemented in other orders other than the order illustrated or described herein. Moreover, the terms "include", "contain" and any other variation thereof are intended to cover the non-exclusive inclusion. For example, a process, method, system, product, or device that includes a series of steps or units is not necessarily limited to such steps or units, but may include other steps or units not expressly listed or inherent to such a process, method, product, or device.

In addition, technical solutions of various embodiments may be combined with each other, but need to be based on the technical solutions that can be implemented by a person of ordinary skill in the art. When a combination of the technical solutions is contradictory or cannot be implemented, it should be considered that such a combination of the technical solutions does not exist and does not fall within the protection scope of the utility model.

Figure 1:
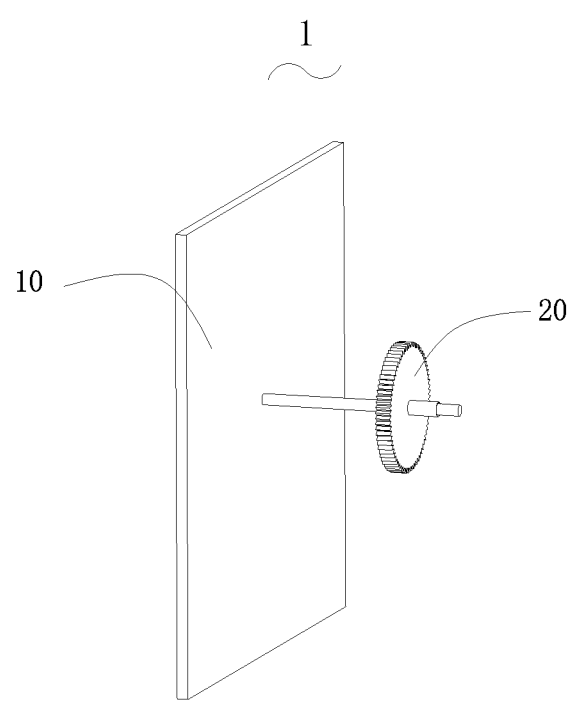
FIG. 1 is a schematic three-dimensional structural diagram of a wing detachment assembly of the utility model.

Referring to FIG. 1, the utility model provides a wing detachment assembly 1 configured to detachably connect a wing of an aerial vehicle to a vehicle body of the aerial vehicle. The wing detachment assembly 1 includes a first connecting portion 10 and a second connecting portion 20. The first connecting portion 10 and the second connecting portion 20 can be quickly detached and connected. Specifically, the first connecting portion 10 is threadedly connected to the second connecting portion 20. One of the first connecting portion 10 and the second connecting portion 20 is fixed on the wing and the other is fixed on the vehicle body. In this embodiment, the description is made by using an example in which the first connecting portion 10 is fixed on the vehicle body and the second connecting portion 20 is fixed on the wing.

Figure 2:
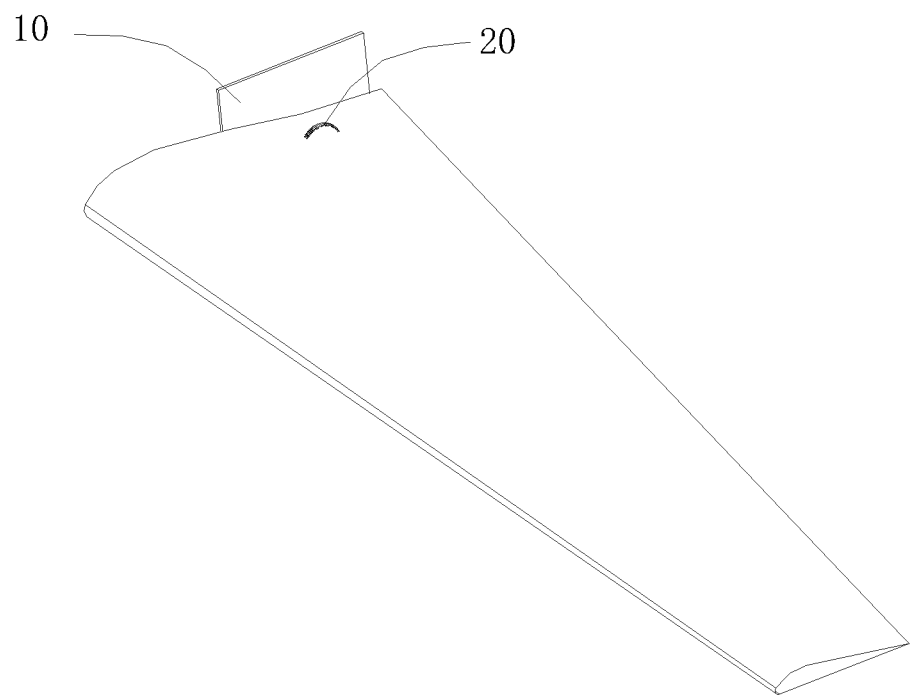
FIG. 2 is a schematic three-dimensional structural diagram of matching a wing detachment assembly with a wing of the utility model.
Figure 3:
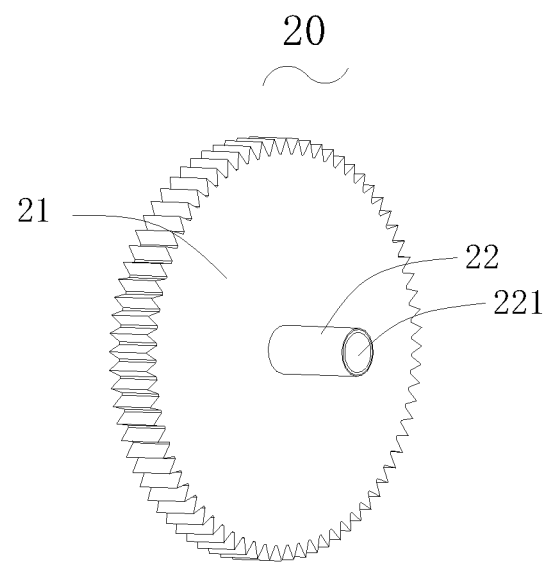
FIG. 3 is a schematic structural diagram of a second connecting portion from a first perspective of the utility model.
Figure 4:
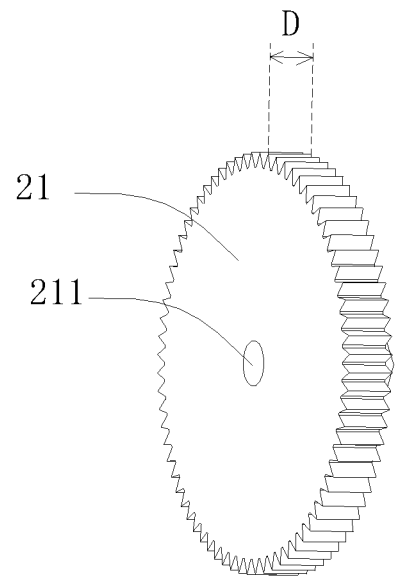
FIG. 4 is a schematic structural diagram of a second connecting portion from a second perspective of the utility model.

Referring to FIG. 2, FIG. 3 and FIG. 4 together, the second connecting portion 20 includes a thumb wheel 21 and a blocking member 22. The thumb wheel 21 is fixedly connected to the blocking member 22. When the thumb wheel 21 is mounted on the wing, a part of the thumb wheel 21 protrudes out of an outer portion of the wing to which the thumb wheel 21 is fixed for a user to rotate the thumb wheel 21. The blocking member 22 is configured to prevent the thumb wheel 21 from falling out of the wing.

A threaded hole 211 is provided on the thumb wheel 21 and is rotatably connected to the first connecting portion 10. A thread is disposed on a hole wall of the threaded hole 211. The thumb wheel 21 is rotatably mounted on the wing. The thumb wheel 21 is disc-shaped. An edge of the thumb wheel 21 is roughly configured and a center of the thumb wheel 21 is provided with the threaded hole 211. The threaded hole 211 is a through hole. A manner for roughly configuring the edge of the thumb wheel 21 is not limited. For example, a pattern or a strip may be disposed on the edge of the thumb wheel 21. Rough configuration of the edge of the thumb wheel 21 enables the user to easily rotate the thumb wheel 21. A diameter of the thumb wheel 21 may be set according to requirements, which is preferably set in a range of 20 mm to 80 mm. The larger the diameter of the thumb wheel 21 is, the less the force is required to rotate the thumb wheel 21. A thickness D of the thumb wheel 21 may be set according to requirements, which is preferably set in a range of 3 mm to 10 mm. The larger the thickness of the thumb wheel 21 is, the less the force is required to rotate the thumb wheel 21.

Figure 5:
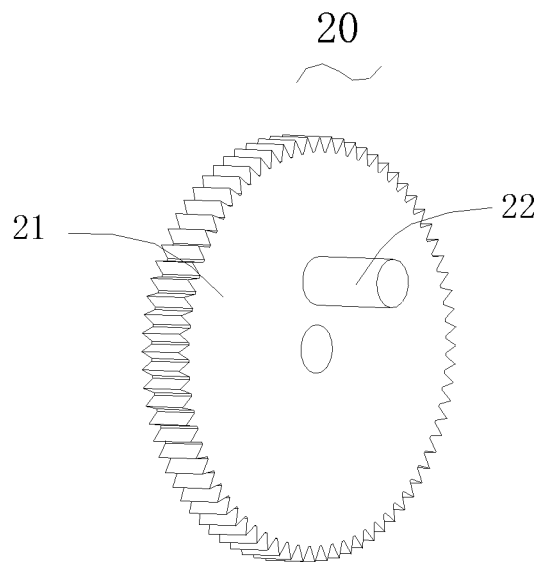
FIG. 5 is a schematic diagram of another structure of a second connecting portion of the utility model.

Referring to FIG. 3 and FIG. 5 together, the blocking member 22 is fixedly connected to one side of the thumb wheel 21. The structure of the blocking member 22 is not limited, which can prevent the thumb wheel 21 from falling out of the wing and does not affect rotation when the thumb wheel 21 is rotated. For example, the blocking member 22 is cylindrical. The blocking member 22 is provided with a center hole 221. The center hole 221 may be concentric to the threaded hole 211. A diameter of the center hole 221 may be greater than a diameter of the threaded hole 211. The diameter of the center hole 221 may alternatively be equal to the diameter of the threaded hole 211. A thread may be disposed on a hole wall of the center hole 221 when the diameter of the center hole 221 is equal to the diameter of the threaded hole 211 A hole is provided on the wing, and the blocking member 22 may be disposed in the hole. The blocking member 22 may alternatively be a cylinder. One cylinder is disposed on one side of the threaded hole 211 and an other cylinder may be disposed in the hole provided on the wing. It is to be understood that the blocking member 22 may be disposed on each side of the thumb wheel 21.

Figure 6:
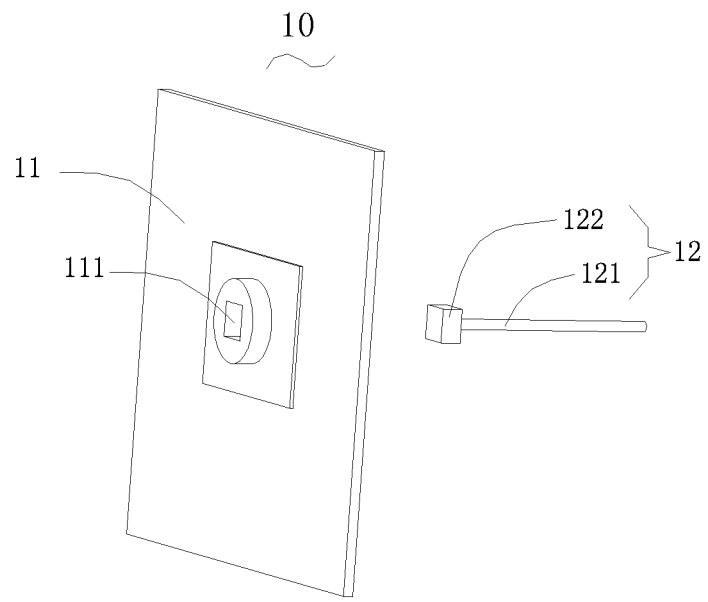
FIG. 6 is a schematic exploded structural diagram of a first connecting portion of the utility model.

Referring to FIG. 6, the first connecting portion 10 includes a connecting plate 11 and a threaded post 12. The connecting plate 11 is fixedly connected to the threaded post 12. The connecting plate 11 is configured to be fixed on the vehicle body. The threaded post 12 is configured to be threadedly connected to the thumb wheel 21 by using the threaded hole 211. It is to be understood that the accompanying drawings merely show a schematic diagram of the first connecting portion 10 and does not limit a proportional relationship between the connecting plate 11 and the threaded post 12.

A shape of the connecting plate 11 is not limited. For example, the connecting plate 11 is circular or quadrilateral. In this embodiment, the connecting plate 11 is fixed on an inner wall of a housing of the vehicle body. The threaded post 12 is rotatably connected to the thumb wheel 21 through the housing of the vehicle body. The connecting plate 11 is firmly fixed on the inner wall of the housing, which is not prone to falling. The connecting plate 11 may be adhered to the inner wall of the housing of the vehicle body. An area of the connecting plate 11 is set according to requirements. When the area of the connecting plate 11 is large, a pressure on the housing of the vehicle body is relatively small. Therefore, the housing of the vehicle body is not necessarily configured to be excessively thick. It is to be understood that, the connecting plate 11 may alternatively be fixed on an outer wall of the housing of the vehicle body or embedded in the housing of the vehicle body.

A manner for fixedly connecting the connecting plate 11 to the threaded post 12 is not limited. The threaded post 12 is fixed relative to the connecting plate 11 and cannot be rotated. For example, the connecting plate 11 and the threaded post 12 may be integrally formed, which are in an interference fit. In this embodiment, a fixing hole 111 is provided on the connecting plate. An end of the threaded post 12 is fixed in the fixing hole 111. The fixing hole 111 is configured to limit rotation of the threaded post 12. The fixing hole 111 is non-circular. In this embodiment, the fixing hole 111 is quadrilateral. A nearby region in which the fixing hole 111 is provided on the connecting plate 11 may be thickened according to requirements, to enhance a connection strength of the connecting plate 11.

The threaded post 12 includes a bolt 121 and a fixing block 122. An end of the bolt 121 is fixedly connected to the fixing block 122. A thread is disposed on a surface of the bolt 121. The bolt 121 is threadedly connected to the threaded hole 211 by using the thumb wheel 21. The fixing block 122 is fixed in the fixing hole 111. The fixing hole 111 limits rotation of the fixing block 122. It is to be understood that configuration of the connecting plate 11 may be omitted, and the threaded post 12 may be fixed on the housing of the vehicle body.

During use, the connecting plate 11 of the first connecting portion 10 is fixed on the inner wall of the housing of the vehicle body and the second connecting portion 20 is rotatably fixed on the wing. When the wing is mounted, the bolt 121 of the threaded post 12 is aligned with the threaded hole 211 and is disposed on an edge of the threaded hole 211. The user manually rotates the thumb wheel 21 in a first rotating direction, so that the threaded post 12 may be threadedly connected to the thumb wheel 21. If the thumb wheel 21 is rotated by specific turns, the first connecting portion 10 may be firmly connected to the second connecting portion 20, thereby fixing the wing on the vehicle body. The thumb wheel 21 is rotated in a second rotating direction opposite to the first rotating direction, so that the first connecting portion 10 and the second connecting portion 20 may be detached from each other, thereby detaching the wing from the vehicle body.

Figure 7:
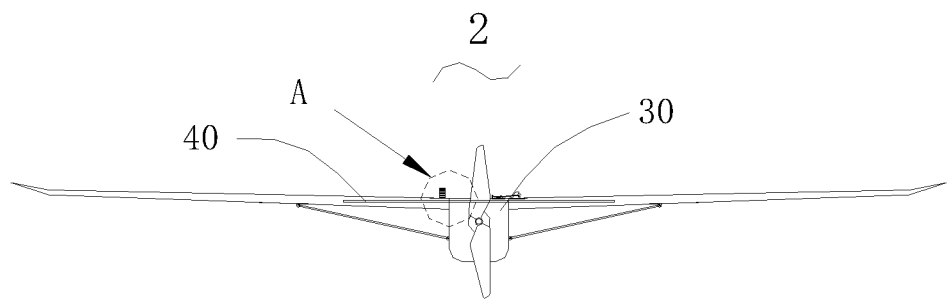
FIG. 7 is a schematic structural diagram of an aerial vehicle of the utility model.
Figure 8:
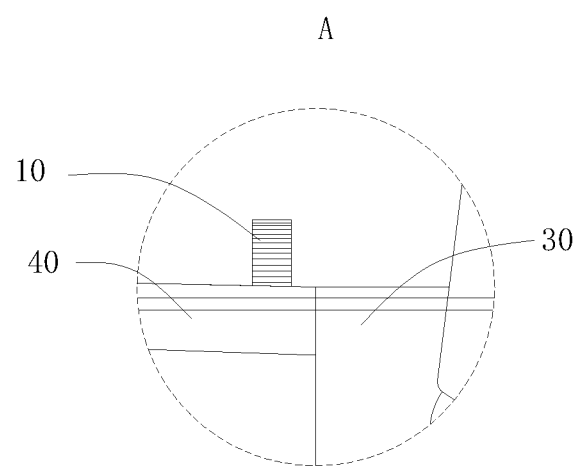
FIG. 8 is an enlarged schematic structural diagram of A in FIG. 7.

Referring to FIG. 7 and FIG. 8 together, the utility model further provides an aerial vehicle 2. The aerial vehicle 2 may include a flight device such as an unmanned aerial vehicle. The aerial vehicle 2 includes a vehicle body 30, a wing 40 and the foregoing wing detachment assembly 1. The wing 40 is detachably connected to the vehicle body 30 by using the wing detachment assembly 1. When the thumb wheel 21 of the wing detachment assembly 1 is mounted on the vehicle body or the wing, a part of the thumb wheel 21 protrudes out of the vehicle body or the wing to which the thumb wheel 21 is fixed. It is to be understood that, when the thumb wheel 21 is rotatably mounted on the vehicle body or the wing, a relief hole may be provided on the vehicle body or the wing, so that the threaded post 12 may be threadedly connected to the thumb wheel 21 of the wing detachment assembly 1.

Compared with existing technologies, in the utility model, the second connecting portion includes a thumb wheel, the thumb wheel being provided with a threaded hole and being configured to be rotatably mounted on the vehicle body or the wing. The first connecting portion is configured to be threadedly connected to a threaded hole of the thumb wheel, the first connecting portion and the thumb wheel being fastened or detached when the thumb wheel is rotated. In this way, the wing can be quickly mounted on the vehicle body and the wing can also be quickly detached from the vehicle body without using a dedicated detachment tool, which is easy to manually detach.

It is to be noted that, the sequence numbers of the foregoing embodiments of the utility model are merely for description purpose but are not intended to indicate the preference of the embodiments. In addition, terms "comprise", "include" or any variation thereof in this specification are intended to cover non-exclusive inclusion. Therefore, a process, a device, an article or a method including a series of elements not only include such elements, but also includes other elements not listed explicitly or includes intrinsic elements for the process, the device, the article, or the method. Unless otherwise specified, an element limited by "include a/an . . . " does not exclude other same elements existing in the process, the device, the article, or the method including the element.

The foregoing descriptions are merely exemplary embodiments of the utility model but are not intended to limit the patent scope of the utility model. Any equivalent modifications made to the structures or processes based on the content of the specification and the accompanying drawings of the utility model for direct or indirect use in other relevant technical fields shall fall within the patent protection scope of the utility model.

What is claimed is:

1. A wing detachment assembly, configured to detachably connect a wing of an aerial vehicle to a vehicle body of the aerial vehicle, wherein the wing detachment assembly comprises a first connecting portion and a second connecting portion, one of the first connecting portion and the second connecting portion being fixed on the wing and the other being fixed on the vehicle body;
    the second connecting portion comprises a thumb wheel, the thumb wheel being provided with a threaded hole and being rotatably mounted on the vehicle body or the wing, wherein the second connecting portion further comprises a blocking member fixedly connected to one side of the thumb wheel; and
    the first connecting portion is threadedly connected to a threaded hole of the thumb wheel, the first connecting portion and the thumb wheel being fastened or detached when the thumb wheel is rotated.

2. The wing detachment assembly according to claim 1, wherein the thumb wheel is disc-shaped, an edge of the thumb wheel is roughly configured and a center of the thumb wheel is provided with the threaded hole, the threaded hole being a through hole.

3. The wing detachment assembly according to claim 1, wherein the blocking member is cylindrical and is provided with a center hole, the center hole being concentric to the threaded hole.

4. The wing detachment assembly according to claim 3, wherein a diameter of the center hole is greater than or equal to a diameter of the threaded hole, a thread being disposed on a hole wall of the center hole.

5. The wing detachment assembly according to claim 1, wherein the first connecting portion comprises a threaded post, the threaded post being fixed on the wing or the vehicle body and being threadedly connected to the threaded hole.

6. The wing detachment assembly according to claim 5, wherein the first connecting portion further comprises a connecting plate, the connecting plate being fixedly connected to the threaded post and being fixed on the vehicle body or the wing.

7. The wing detachment assembly according to claim 6, wherein the connecting plate is fixed on an inner wall of a housing of the vehicle body or the wing, and the threaded post passes through the housing of the vehicle body or the wing to be threadedly connected to the thumb wheel.

8. The wing detachment assembly according to claim 6, wherein the threaded post comprises a bolt and a fixing block, the bolt being fixedly connected to the fixing block, and the connecting plate is provided with a fixing hole, the fixing block being fixed in the fixing hole and the fixing hole limiting the fixing block in rotating.

9. An aerial vehicle, comprising:
a vehicle body;
a wing; and
a wing detachment assembly, wherein the wing detachment assembly comprises a first connecting portion and a second connecting portion, one of the first connecting portion and the second connecting portion being fixed on the wing and the other being fixed on the vehicle body;
the second connecting portion comprises a thumb wheel, the thumb wheel being provided with a threaded hole and being rotatably mounted on the vehicle body or the wing, wherein the second connecting portion further comprises a blocking member fixedly connected to one side of the thumb wheel;
the first connecting portion is threadedly connected to a threaded hole of the thumb wheel, the first connecting portion and the thumb wheel being fastened or detached when the thumb wheel is rotated; and
the wing is detachably connected to the vehicle body by using the wing detachment assembly and a part of the thumb wheel protrudes out of the vehicle body or the wing to which the thumb wheel is fixed.

10. The aerial vehicle according to claim 9, wherein the thumb wheel is disc-shaped, an edge of the thumb wheel is roughly configured and a center of the thumb wheel is provided with the threaded hole, the threaded hole being a through hole.

11. The aerial vehicle according to claim 9, wherein the blocking member is cylindrical and is provided with a center hole, the center hole being concentric to the threaded hole.

12. The aerial vehicle according to claim 11, wherein a diameter of the center hole is greater than or equal to a diameter of the threaded hole, a thread being disposed on a hole wall of the center hole.

13. The aerial vehicle according to claim 9, wherein the first connecting portion comprises a threaded post, the threaded post being fixed on the wing or the vehicle body and being threadedly connected to the threaded hole.

14. The aerial vehicle according to claim 13, wherein the first connecting portion further comprises a connecting plate, the connecting plate being fixedly connected to the threaded post and being fixed on the vehicle body or the wing.

15. The aerial vehicle according to claim 14, wherein the connecting plate is fixed on an inner wall of a housing of the vehicle body or the wing, and the threaded post passes through the housing of the vehicle body or the wing to be threadedly connected to the thumb wheel.

16. The aerial vehicle according to claim 14, wherein the threaded post comprises a bolt and a fixing block, the bolt being fixedly connected to the fixing block, and the connecting plate is provided with a fixing hole, the fixing block being fixed in the fixing hole and the fixing hole limiting the fixing block in rotating.

* * * * *